United States Patent

[11] 3,631,981

[72] Inventor Douglas L. G. Young
 Pierrefonds, Quebec, Canada
[21] Appl. No. 797,143
[22] Filed Feb. 6, 1969
[45] Patented Jan. 4, 1972
[73] Assignee Canadian Ingersoll-Rand Company
 Limited
 Montreal, Quebec, Canada

[54] BLOTTED PULP SCREEN
 13 Claims, 5 Drawing Figs.
[52] U.S. Cl. .................................................. 209/399,
 210/497
[51] Int. Cl. .................................................. B07b 1/00,
 B07b 1/46
[50] Field of Search .......................................... 209/392,
 397, 270; 210/497, 457, 497.1, 497.11; 29/163.5
 F, 163.5 CW

[56] References Cited
 UNITED STATES PATENTS
 828,715 8/1906 Cook .......................... 210/497

| 1,916,393 | 7/1933 | Smith | 209/397 |
| 2,086,067 | 7/1937 | Cleveland | 209/397 X |
| 3,200,952 | 8/1965 | Jardin | 210/457 |
| 3,276,584 | 10/1966 | Mathewson | 209/270 X |
| 2,820,549 | 1/1958 | Belke | 210/497.1 X |
| FOREIGN PATENTS | | | |
| 453,332 | 12/1948 | Canada | 209/392 |
| 1,140,153 | 11/1962 | Germany | 210/497 |

Primary Examiner—Frank W. Lutter
Assistant Examiner—Robert Halper
Attorneys—Carl R. Horten and David W. Tibbott ABSTRACT: A screen comprising an annular body having screening and accepts side faces. The body includes a plurality of generally longitudinally extending screening slots projecting from its screening face through only a portion of the body thickness and a plurality of sets of accepts slots projecting from is accepts face through only a portion of the body thickness. The sets of accepts slots are each arranged along the length of one of the screening slots and each communicate with said one of the screening slots.

INVENTOR
DOUGLAS L. G. YOUNG

Robert R. Paquin
ATTORNEY

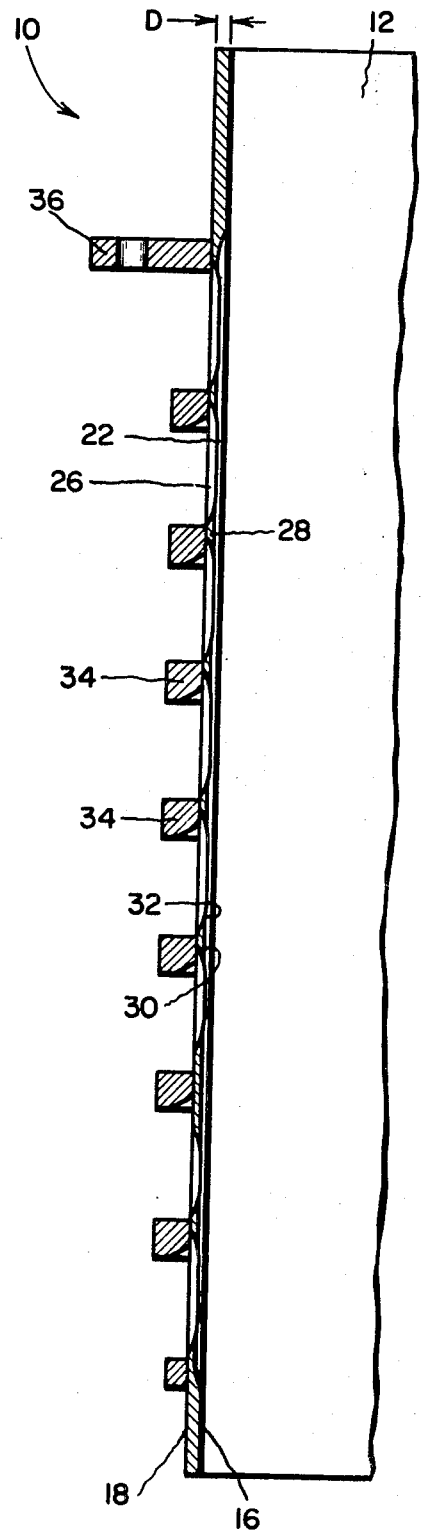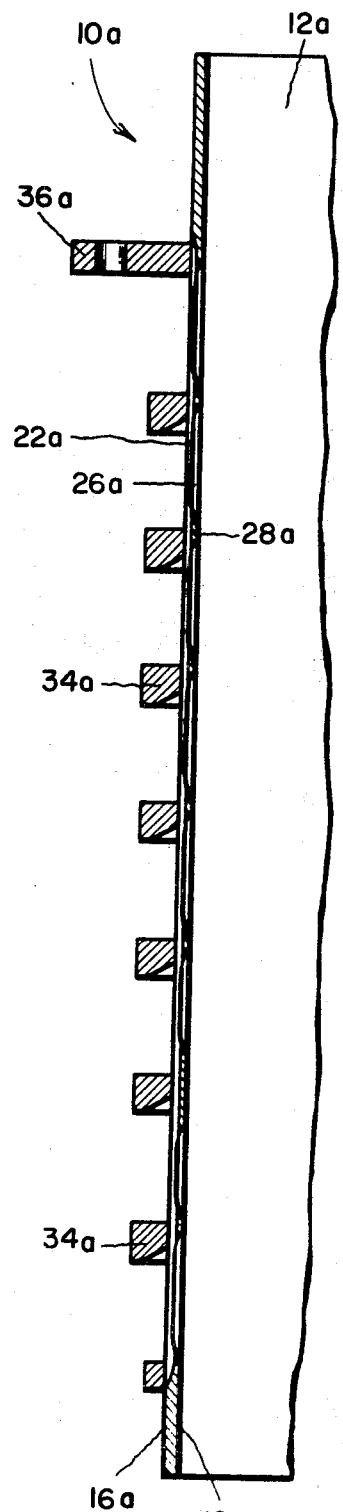
FIG. 3
FIG. 4
INVENTOR
DOUGLAS L. G. YOUNG
Robert L. Paquin
ATTORNEY

SLOTTED PULP SCREEN

BACKGROUND OF THE INVENTION

The present invention relates to the separation of desirable material from undesirable material in a suspension such as, by way of example, the slurries employed in pulp and papermaking.

Conventionally, screens for separating desirable material from undesirable material in a suspension most commonly have been formed of a mesh or perforate construction. Sometimes, however, these screens have been constructed from plate material provided with through slots of very fine width. The employment of a slotted-type screen has, however, been greatly limited due to the difficulties inherent in manufacturing conventional screens of this type and the necessity that such conventional screens be of undesirably weak thickness and/or weak construction. More particularly, the fine width slots contained in these conventional slotted screens can only be cut through a metal having a relatively weak cross section. This requirement for a weak cross section screen is, of course, inconsistent with the requirement of a pressurized screening apparatus for a strong cross section screen having high fatigue resistance and, due to the pressure differential across the screen inherent in pressurized screening apparatus, makes conventional slotted screens undesirable for this application. In addition, conventional slotted screens generally are characterized by frequent blinding at the ends of the screen slots and undesirably low flow capacity as compared to a conventional mesh-type screen.

SUMMARY OF THE INVENTION

An object of the present invention is to provide a new and improved slotted-type screen which is particularly constructed and arranged to be of strong durable construction and greatly resistant to fatigue.

Another object of the invention is to provide a new and improved slotted-type screen which is particularly constructed and arranged to include a flow capacity in excess of conventional screens of its type and to, moreover, be relatively insusceptible to screen blinding.

In general, these objects of the invention are attained by the construction of a screen to include a body having a pair of side faces and at least one slot projecting from one of the side faces through only a portion of the thickness of the body. The body is also formed to include a plurality of other slots projecting from the other of its side faces through only a portion of the body thickness and communicating with said one slot.

BRIEF DESCRIPTION OF THE DRAWINGS

Referring to the drawings:

FIG. 3 is a fragmentary, elevational sectional view of the screen shown in FIGS. 1 and 2;

FIG. 4 is a fragmentary elevational sectional view, generally similar to FIG. 3, but illustrating a screen constructed in accordance with an alternative embodiment of the invention.

DESCRIPTION OF THE PREFERRED EMBODIMENTS

Figure 2:
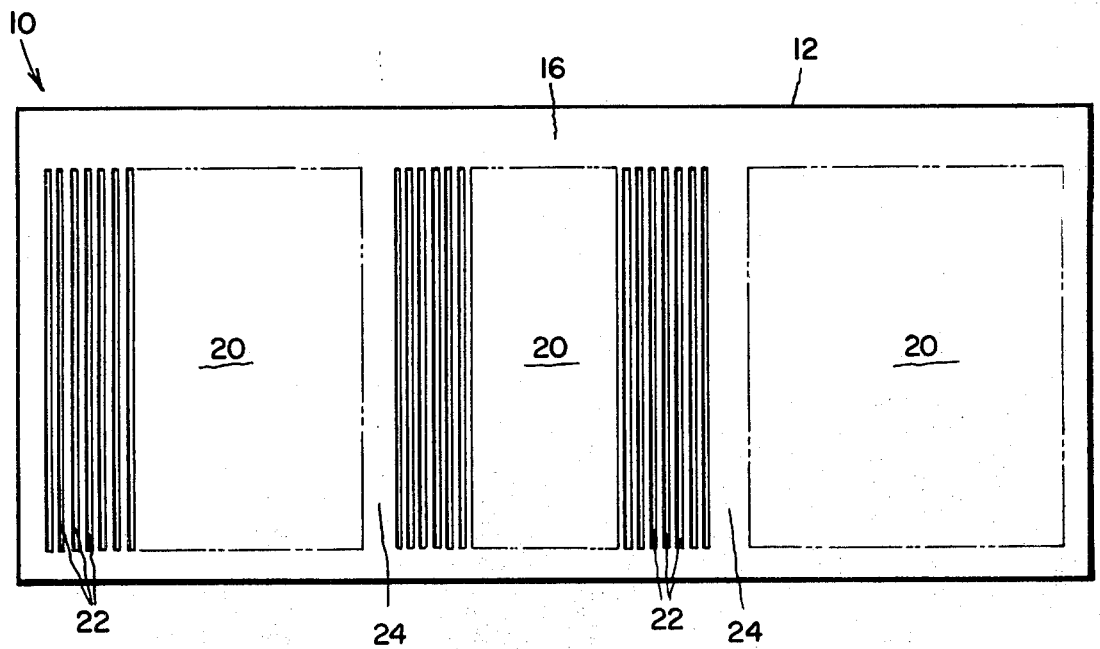
FIG. 2 is an expanded view of the screen shown in FIG. 1.
Figure 1:
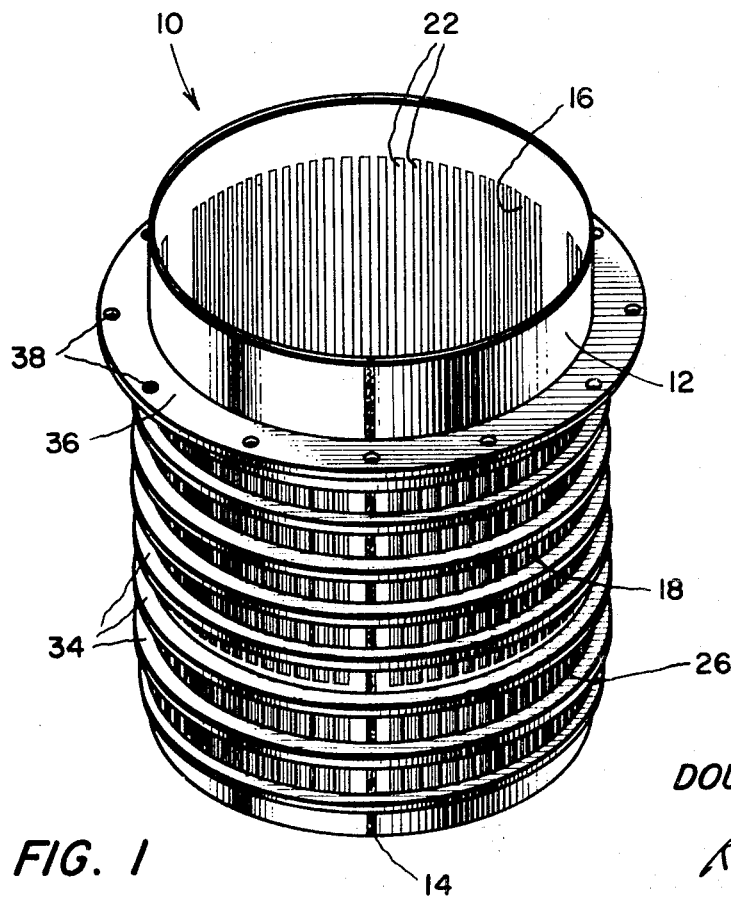
FIG. 1 is a perspective view of a screen constructed in accordance with one embodiment of the invention.

Referring more particularly to the drawings wherein similar reference characters designate corresponding parts throughout the several views, FIGS. 1 through 3 illustrate a screen designated generally as 10 which comprises a body 12 rolled to annular configuration and welded in such configuration by at least one longitudinal continuous weld 14. The screen 10 is of the outward flow type and particularly constructed to separate a suspension supplied along the inner circumference of the body 12 whereby material accepted by the screen 10 passes outwardly therethrough. Hence, the body 12 includes an inner circumferential, annular inlet or screening side face 16 along which the suspension being screened is directed and an outer circumferential, annular discharge or accepts side face 18 from which the accepted material is discharged.

The screening face 16 is provided with a plurality of identical groups or clusters 20 of juxtaposed fine or screening slots 22 formed to axially extend in a direction generally longitudinally of the body 12; and the screening slot groups 20 are equally spaced circumferentially around the body 12 by unslotted or land portions 24 of the latter. The screening slots 22 are all of identical construction and configuration and each axially extend uninterrupted throughout a major portion of the length of the body 12. Moreover, as shown in FIG. 3 wherein one of the screening slots 22 has been depicted for the purposes of illustration, the screening slots 22 are each formed to project from the screening face 16 through only a portion of the depth or thickness D of the body 12 and do not project through the body 12 to the accepts face 18. In addition, as will be seen from FIG. 3, the screening slots 22 each shorten or taper in length as they extend into the thickness D of the body 12.

The accepts face 18 is provided with a plurality of sets or groups of relief or accepts slots, such sets corresponding in number to the screening slots 22 and each comprising a plurality of accepts slots aligned directly opposite one of the screening slots 22 and in communication therewith. The sets of accepts slots in the accepts face 18 are all of identical construction and arrangement and, as shown in FIG. 3 wherein one set has been depicted for the purposes of illustration, each comprise a plurality of relatively short accepts slots 26 of greater width than the screening slots 22 and formed at locations axially spaced along one of the screening slots 22 throughout the length of the latter. The accepts slots 26 are formed to project from the accepts face 18 through only a portion of the thickness or depth D of the body 12, and are of a depth such that they connect with their respective screening slot 22 and communicate with the latter. The accepts slots 26 each shorten or taper in length as they extend into the thickness D of the body 12. The accepts slots 26 are separated by ribs or lands 28 which cooperate to form a bottom for the respective communicating screening slot 22 and are at their inner surface 30 sufficiently recessed or offset from the screening face 16 that the screening slots 22 are of sufficient depth to facilitate or permit fluid flow along the corners 32 of the lands 28. Thus, due to their recessed location, the corners 32 are less susceptible to stress than those of conventional slotted screens located at the screening face and also facilitate fluid flow from the screening slots 22 at the ends of the accepts slots 26.

A plurality of annular ribs or rings 34 are circumferentially disposed around the accepts face 18 at axially spaced locations along the length of the body 12. The ribs 34 are welded to the outer circumference of the land portions 24 of the body 12 and contoured to abut the body 12 around the sets of accepts slots 26 in the accepts face 18. The ribs 34 are not, however, affixed to the portions of the accepts face 18 containing the accepts slots 26, but rather merely snugly receive such portions of the accepts face 18 along their inner circumferences. Thus, the ribs 34 serve to take the hoop stress arising due to the differences in pressure on the screening and accepts faces 16, 18 when the screen 10 is employed in a pressurized screening apparatus. The aforedescribed land portions 24 of the body 12 take any axial loading of the screen 10 and also torsional load of the screen 10 arising from the torque reaction of fluid flow through the communicating slots 22, 26. In addition, a mounting ring 36, having openings 38 arranged to receive conventional mounting bolts (not shown), is welded to the land portions 24 and arranged circumferentially around the accepts face 18 adjacent one end of the latter. This mounting ring 36, as will be understood, is provided for affixing the screen 10 in a screening apparatus such as, for example, that disclosed in my U.S. Pat. application Ser. No. 554,826, filed June 2, 1966 and entitled Screening Apparatus now U.S. Pat. No. 3,458,038.

In the operation of a screening apparatus provided with the aforedescribed screen 10, the suspension to be screened is supplied to one end of the screening face 16 and directed circumferentially around and axially along such screening face 16. The material in the suspension accepted by the screen 10 flows outwardly through the screening slots 22 into the accepts slots 26 from whence it is discharged by the screen 10. (The flow from the screening slots 22 into the accepts slots 26, as will be understood, is such that material buildup at the ends of the lands 28 is prevented and; hence, frequent cause of conventional screen plugging is avoided.) The material rejected by the screen 10 continues along the screening face 16 and is discharged from the end of the screen 10 opposite to that at which it was introduced.

In the manufacture of the aforedescribed embodiment of the present invention, the slots 22, 26 are preferably cut in the body 12 prior to the latter being rolled to its annular configuration. More specifically, in the body 12 is initially in the form of a flat metal plate which is preferably of stainless steel or the like. The screening slots 22 are first formed by a conventional fine milling cutter in one face of the body 12 whereby, as aforedescribed, they project from said one face through only a portion of the thickness or depth of the body 12. The screening slots 22 are arranged in the aforedescribed groups of juxtaposed slots separated by land portions 24 of the body 12. Then, the accepts slots 26 are formed by a wider milling cutter in the other face of the body 12 to project only partially through the thickness or depth of the latter and into communication with the previously formed screening slots 22. The accepts slots 26 are, as aforedescribed, formed at intervals along the lengths of the screening slots 22 and directly opposite their communicating screening slot 22. The body 12 is then rolled to annular configuration. Thereafter, the annular ribs 34 are positioned along the face of the body 12 containing the accepts slots 26 and welded to the land portions 24; and the mounting ring 36 is affixed to the body 12.

FIG. 4, wherein parts similar to those aforedescribed with reference to the screen 10 illustrated in FIGS. 1 through 3 are designated by the reference characters for their previously described similar parts followed by the suffix a, fragmentarily illustrates a screen 10a constructed in accordance with an alternative embodiment of the invention. The screen 10a, as will be understood, is different from the previously described screen 10 primarily in that it is of the inward flow type wherein material accepted by the screen flows inwardly therethrough. Thus, the outer circumference of the annular body 12a forms the screening or inlet face 16a thereof and the inner circumference of the body 12a forms its discharge or accepts face 18a. The screening slots 22a are identical to the screening slots 22 of the screen 10; and the accepts slots 26a are also identical to the accepts slots 26 of the screen 10. As will be noted, in this embodiment of the invention the reinforcing ribs 34a and mounting ring 36a are connected around the screening face 16a inasmuch as the latter constitutes the outer circumference of the body 12a.

The operation of a screening apparatus including the screen 10a is believed to be apparent from the aforegoing description. Similarly, the method of making the screen 10a is identical to that aforedescribed for the screen 10 except that the plate forming the body 12a is rolled in the opposite direction such that the screening slots 22a are formed in the outer circumference of the body 12a; and the reinforcing rings 34a and the mounting ring 36a are installed on the screening face 16a.

Figure 5:
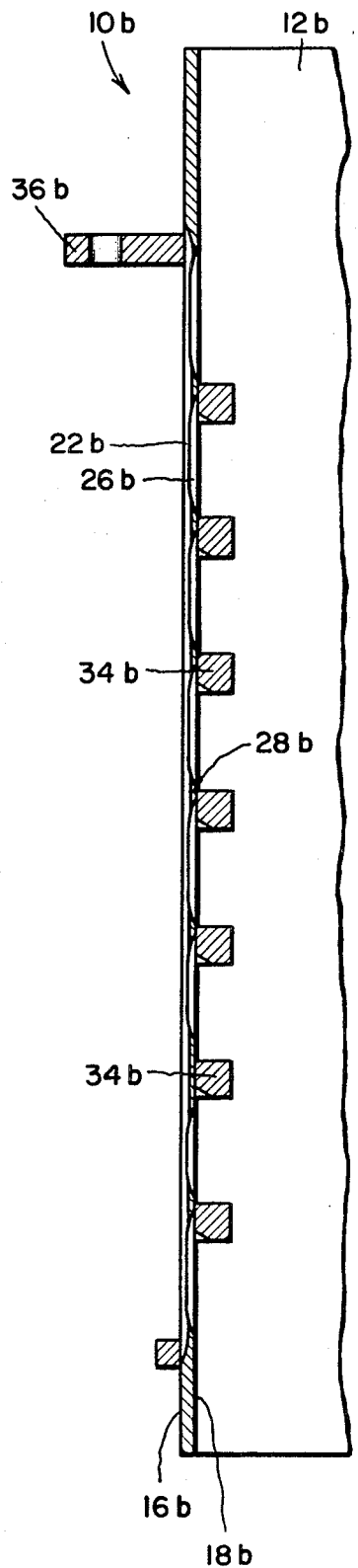
FIG. 5 is a fragmentary elevational sectional view, generally similar to FIG. 4, but illustrating a screen constructed in accordance with another alternative embodiment of the invention.

FIG. 5, wherein parts similar to those previously described with reference to the screen 10 illustrated in FIGS. 1 through 3 are designated by the reference characters for their previously described similar parts followed by the suffix "b," fragmentarily illustrates a screen 10b constructed in accordance with another alternative embodiment of the invention. The screen 10b is different from the screen 10a only in that the reinforcing ribs 34b are arranged around the inner circumferential accepts face 18b of the body 12b. Hence, the operation of a screening apparatus including the screen 10b and the method of making the screen 10b, are both believed to be apparent from the aforegoing description.

From the aforegoing description it will be seen that I have provided a new and improved screen for accomplishing all of the objects and advantages of my invention. It will be understood, however, that, although I have illustrated this screen in annular configuration, the screen could be employed in a flat plate or frustoconical configuration.

It will, moreover, be understood that, although I have illustrated and hereinbefore described only three embodiments of my invention, the invention is not limited merely to these embodiments but rather contemplates other embodiments and variations within the scope of the following claims.

Having thus described my invention I claim:

1. A screen for separating material in a suspension comprising an annular body having a screening side face and an accepts side face, said body including a plurality of screening slots of uniform width which each project from said screening face through only a portion of the thickness of said body and axially extend in a direction generally longitudinally of said body, and said body including a plurality of sets of accepts slots which project from said accepts face through only a portion of the thickness of said body, the accepts slots of each of said sets being separated from one another by therebetween portions of said body and being generally aligned along one of said screening slots, said screening slots being constructed of depths sufficient to permit fluid flow from said screening slots to said accepts slots adjacent said therebetween portions, said accepts slots being of shorter length and greater width than their communicating screening slots.

2. A screen according to claim 1, wherein said screening and accepts faces are the inner and outer side faces, respectively, of said body.

3. A screen according to claim 1, wherein said screening and accepts faces are the outer and inner side faces, respectively, of said body.

4. A screen according to claim 1, wherein said screening slots each axially extend throughout a substantially portion of the length of said body.

5. A screen according to claim 1, wherein said screening slots are arranged in groups spaced by lands circumferentially around said body.

6. A screen according to claim 5, wherein reinforcing means are arranged around said body and affixed to said lands.

7. A screen according to claim 5, wherein reinforcing means are arranged within said body and affixed to the inner circumference thereof.

8. A screen for separating material in a suspension comprising an annular body having a screening side face and an opposite accepts side face, said body including a plurality of screening slots of uniform width which each project from said screening face only partially through the thickness of said body and extend axially in a direction generally longitudinally of said body throughout the major portion of the length thereof, and said body including a plurality of sets of accepts slots projecting from said accepts face only partially through the thickness of said body, said sets of accepts slots each including a plurality of accepts slots of shorter length and greater width than said screening slots said slots separated from one another by lands and being generally aligned in a direction generally longitudinally of said body opposite one of said screening slots, and the accepts slots of each of said sets communicating with said opposite one of said screening slots to receive fluid flow therefrom said screening slots being constructed of sufficient depths to permit said fluid flow from said screening slots to said accepts slots adjacent said lands.

9. A screen according to claim 8, wherein said screening slots are arranged in groups spaced by lands circumferentially of said body, and at least one reinforcing ring is arranged along a circumference of said body and affixed to said lands.

10. A screen according to claim 8, wherein said screening and accepts faces are the inner and outer side faces, respectively, of said body.

11. A screen according to claim 8, wherein said screening and accepts faces are the outer and inner side faces, respectively, of said body.

12. A screen for separating material in suspension comprising an annular body having a screening face and an accepts face, said body including a plurality of screening slots of uniform width projecting from said screening face through only a portion of the thickness of said body and said body also including a plurality of sets of accepts slots projecting from said accepts face through only a portion of the thickness of said body, each of said sets of accepts slots comprising a plurality of generally longitudinally aligned accepts slots at intervals along the length of one of said screening slots in communication with such screening slot and said accepts slots being of greater width than their communicating screening slots said screening slots being constructed of sufficient depths to permit said fluid flow from said screening slots to said accepts slots adjacent said intervals.

13. A screen according to claim 12, wherein said screening and accepts slots each shorten in length as they extend inwardly in said body.

* * * * *

PO-1050
(5/69)

UNITED STATES PATENT OFFICE
CERTIFICATE OF CORRECTION

Patent No. 3,631,981                    Dated January 4, 1972

Inventor(s) Douglas L. G. Young

It is certified that error appears in the above-identified patent and that said Letters Patent are hereby corrected as shown below:

Line numbered (54) on the page containing the Abstract and Column 1, line 1, "BLOTTED PULP SCREEN", each occurence, should read--SLOTTED SCREEN FOR SEPARATING MATERIAL IN A SUSPENSION--.

Column 4, lines 20 and 53, and Column 5, line 9, immediately after "suspension", each occurence, there should be inserted a comma--,--.

Column 4, line 31, immediately after "slots", first occurence, there should be inserted--in communication therewith--.

Column 4, line 33, the comma "," should be cancelled and there substituted therefor--of said body, and--.

Column 4, line 64, "said", second occurence, should be cancelled and there substituted therefor--, the accepts--.

Column 4, line 64, immediately after "slots", second occurence there should be inserted--of each of said sets being--.

Column 4, line 65, "being" should be cancelled.

Column 4, line 67, "and" should be cancelled.

Column 4, line 69, immediately after "therefrom" there should be inserted--,and--.

Column 5, line 9, immediately after "in" there should be inserted--a--.

Column 6, line 6, immediately after "slots" there should be inserted a comma--,--.

Column 6, line 8, "said" first occurence, should be cancelled.

Column 6, line 10, "said intervals" should read--the ends of said accepts slots--.

Signed and sealed this 11th day of July 1972.

(SEAL)
Attest:

EDWARD M. FLETCHER, JR.
Attesting Officer

ROBERT GOTTSCHALK
Commissioner of Patents